June 29, 1965 J. E. COORDES 3,191,962
ARTICULATING HEAVY EQUIPMENT TRANSPORTER
Filed Nov. 1, 1963 3 Sheets-Sheet 3

INVENTOR.
JOHN E. COORDES
BY H. M. Saragovitz
E. J. Kelly
H. Berl and
E. Barthel
ATTORNEYS

United States Patent Office 3,191,962
Patented June 29, 1965

3,191,962
ARTICULATING HEAVY EQUIPMENT TRANSPORTER
John E. Coordes, Birmingham, Mich., assignor to the United States of America as represented by the Secretary of the Army
Filed Nov. 1, 1963, Ser. No. 320,972
6 Claims. (Cl. 280—81)
(Granted under Title 35, U.S. Code (1952), sec. 266)

The invention described herein may be manufactured and used by or for the Government of the United States of America for governmental purposes without the payment of any royalties thereon or therefor.

This invention relates generally to semitrailers and more particularly to unsprung articulated trailers.

The trailer will be described in connection with a tracked vehicle, but it is to be understood that the invention may be used to transport vehicles of all types. Exceptionally large loads are frequently carried in commercial transportation and also in military operations. Present warfare, for example, requires the transporting of extremely heavy equipment, such as disabled combat tanks and the like. In addition, such vehicles must frequently operate off paved roads and over rough terrain. Consequently, not only must a large number of wheels be provided to carry the load and to reduce ground pressure to a reasonable figure, but a suspension system must be provided which will allow travel over obstacles and rough terrain.

To meet these conditions, the present invention provides a vertical articulated trailing unit bed having two chassis parts joined by a hinged coupling for the pivotal movement of one chassis part with respect to the other about a horizontally disposed axis to insure constant ground clearance. The trailer main frame members are utilized as the loading platform for the vehicle to be transported. The axles are located inboard of the frame members and the entire unit is unsprung with the exception of that provided by the low pressure tires. However, the invention fully utilizes the suspension arrangement of the vehicle being transported.

It is an object of the present invention to provide a mobile load carrying apparatus, and more particularly, to such a mobile load carrying apparatus suitable for highway and limited off-highway use.

Another object of the invention is the provision of a mobile track vehicle carrying apparatus, whereby the road wheels are located under the payload vehicle and between its tracks, greatly reducing the previous overall height and enabling the loaded trailer to easily pass under the required 13 feet 6 inch underpass without unloading or removal of the payload cupola.

Another object of the invention is to provide a vertical articulated vehicle transporter which cradles the payload by having the center of gravity of the load positioned substantially in the vertical plane common to that of the articulation axes.

Other objects and a fuller understanding of the invention may be had by referring to the following description and claims, taken in conjunction with the accompanying drawings in which:

Figure 1:
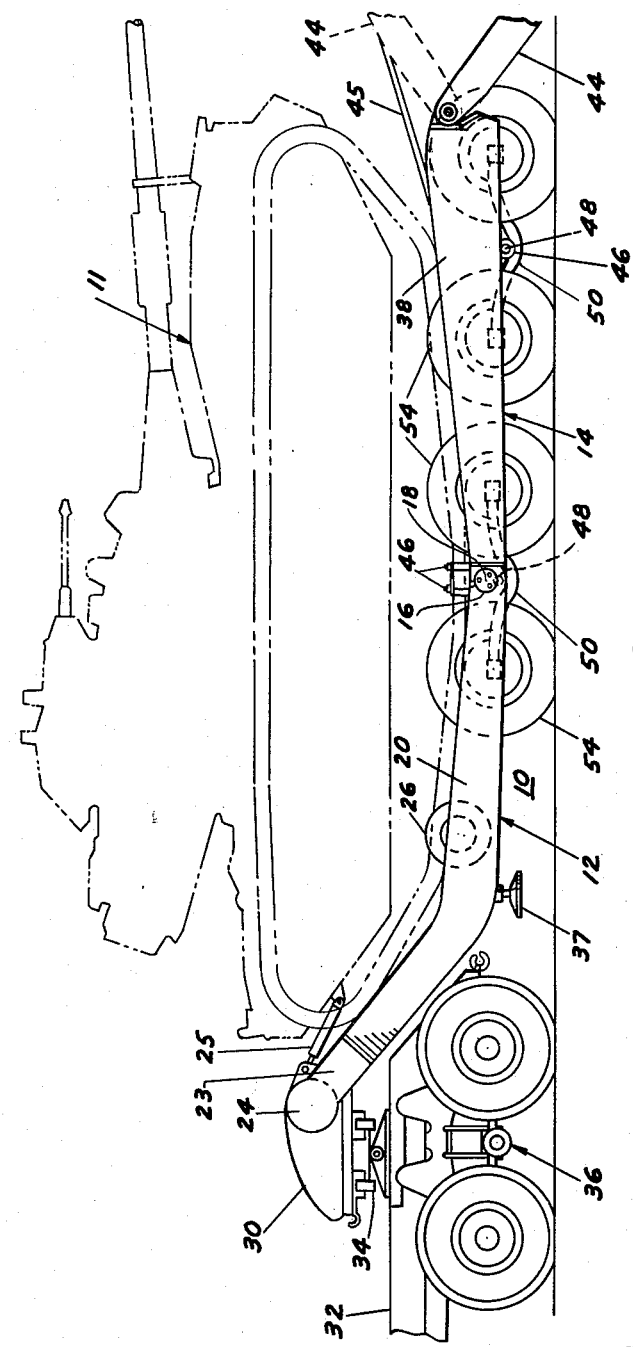
FIG. 1 is a side elevation of a trailer and a portion of a towing tractor embodying the present invention.

The trailer 10, shown transporting tank 11, comprises a front frame unit 12 and a rear trail unit 14, pivotally interconnected at the articulating knuckle joints 16 by pins 18. In order to eliminate lubrication maintenance, plastic bearings 19 are provided for the joints 16. The front unit 12 comprises two main longitudinal side box frame tails 20, intermediate cross I-beams 22 and a tubular frame member 24. Forward toed-in sections 23 connect the side sills 20 to the tube 24. Only two hydraulic tie-down links 25, between the tube 24 and the forward portion of the tank, are required to retain the vehicle in position. Winch 26 is supported between cross I-beams 22 by means of struts 28. A raised forward projection, or neck 30, extends over the rear portion of the tractor 32 to which the semitrailer is connected by means of fifth wheel 34. The connection between the tractor and the trailer 10 could be accomplished by any suitable means, as for example, a fixed cylinder and movable piston of the type manufactured by the LeTourneau-Westinghouse Company under the name Hydrair Suspension. While the performance of the trailer is unaffected by the type of connection, the overall length of the transporter can be reduced using a Hydrair type connection and a 4 x 4 tractor. The tractor 32 requires only one tandem carriage unit 36 to support the forward end of the trailer unit 12. For a landing gear the trailer utilizes hydraulic jacks 37 fixed to the rails 20.

The rear trail unit 14 comprises two longitudinal side sills 38 of hollow box frame construction fixably positioned by means of joints 16 to form a continuation of the sills 20. The rails 38 are maintained in spaced relation by means of transverse frames 40 and 42 also of hollow box frame construction. A loading ramp 44 is pivotally connected to the aft end of each of the sills 38. Struts 45 are used to maintain the ramps in raised position during travel of the vehicle.

U-shaped tie rod brackets 46 are arranged about the box frames 40 and 42 to support two pair each of trunnion bearings 47 on each of the cross frames. A longitudinal walking beam 50 is positioned between each pair of bearings 47 and extends fore and aft of its associated cross frame member. The walking beams are provided with trunnion axles 48, projecting coaxially from opposite sides, and supported in the bearings 47 to allow each walking beam to pivot in a vertical plane about its trunnion axis. Mounting of all but the rearmost four wheels is accomplished by means of journals 51 which are fiixably set in sleeves 52 by means of retaining pins. Cross axles (not shown) extend from the sides of the sleeves 52, and wheels 54 are mounted on the axles at each side of the walking beams.

In order to increase the mobility (minimize the turning radius) of the trailer 10, the trailing wheels and their associated axles 55 are castered to the walking beams by means of forked joints 56 and king pins 58. The advantage of allowing the rear axles to caster permits the trailing wheels to better track when the transporter negotiates a sharp turn.

Figure 2:
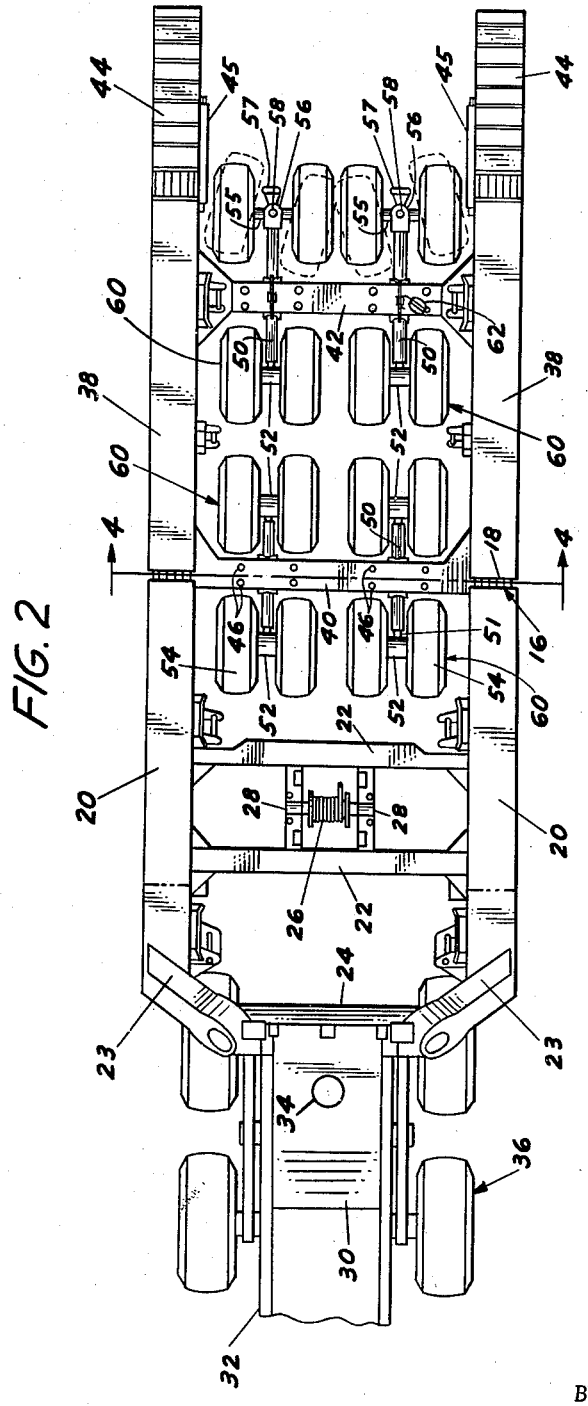
FIG. 2 is a plan view of the vehicle shown in FIG. 1.
Figure 3:
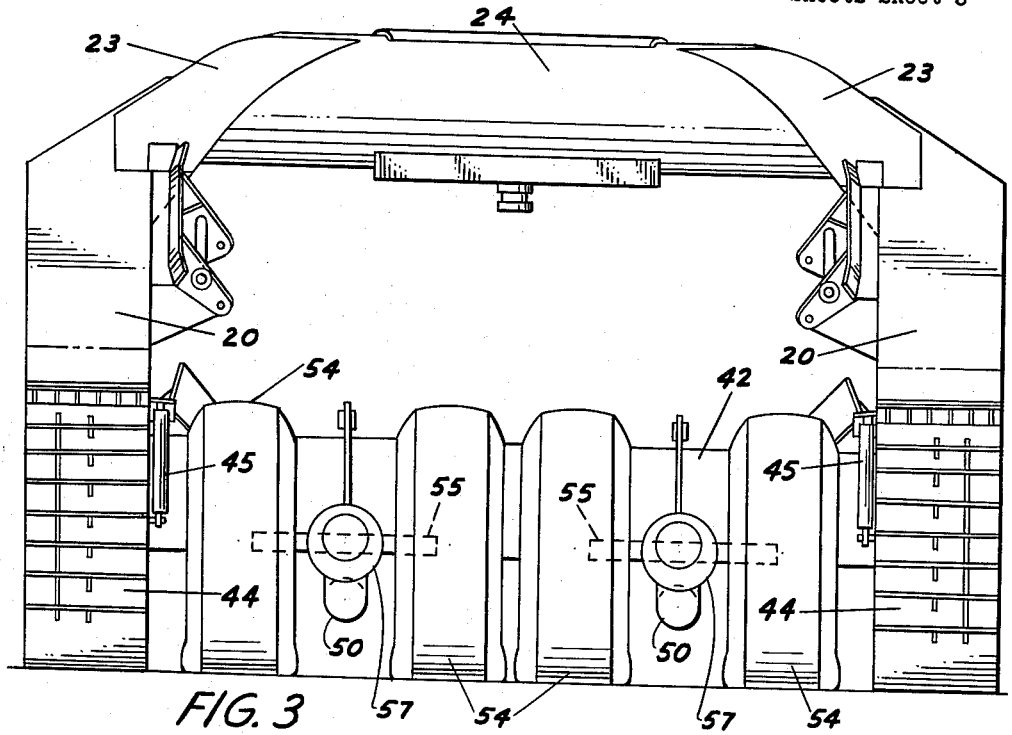
FIG. 3 is a rear end view of the trailer.

Thus, each walking beam and its supporting four wheels constitute an independently oscillating bogie truck 60. With this construction, there is freedom for the wheel so that all carry their proportionate part of the load. As can be seen in FIG. 2, two such bogie trucks are supported on each of the cross frames 40 and 42. It will also be noted that the axis of the pivot pins 18 and that of the trunnion axles 48, secured to member 40, are located in a common vertical plane.

In operation the trailer is wheeled to the tank 12 or vehicle to be transported. Four loading jacks (not shown), used for stabilizing the trailer, are placed under the frame of the rear trail unit 14. The pivotally connected pair of loading ramps 44 are lowered and the tank is either driven on the transporter or drawn up the ramps by means of winch 26. In order to facilitate unloading of the vehicle, a snatch block 62 is attached to the rear cross frame 42 and the cable from the winch 26 is threaded through the snatch block and attached to the front of the disabled tank. The unloading operation is performed by utilizing the trailer winch cable to pull the vehicle off the transporter, while a second winch (not shown), located on the tractor 32, is used to check the movement of the tank. The result is complete control of the unloading at all times for either a track or trackless vehicle.

The procedure for changing a tire or wheel on the trailer requires jacking up the walking beam involved and blocking out its articulation. A retaining pin is removed from the walking beam and the entire axle assembly is pulled outward on journal 51 approximately two inches. The axle assembly can then be rotated seventy degrees in either direction in order to place the tire and wheel in an almost horizontal position facing upward. After this, the tire change can be carried out in a normal manner with no difficulty. The rear wheels are changed in a slightly different manner. The air actuator 57, which operates the rear caster locking pins, is removed and the king pin 58 tapped out. After this, the entire rear axle assembly 55 can be rolled clear of the vehicle. The tire changing operation is then carried out in a normal manner.

As a result of the sloping convergence of the upper surface of the rails 20 and 38, as shown in FIG. 1, the transporter frame provides a support which partially cradles the tank. The cradle support is assisted by the location of the center of gravity of the loaded trailer substantially in the vertical plane intersecting the articulating joints 16. This arrangement stabilizes the payload and only the forward tie down links 25 are needed to retain the tank in position. Additional safety chains are provided, but they are not used to tightly bind the tank to the trailer.

Figure 4:
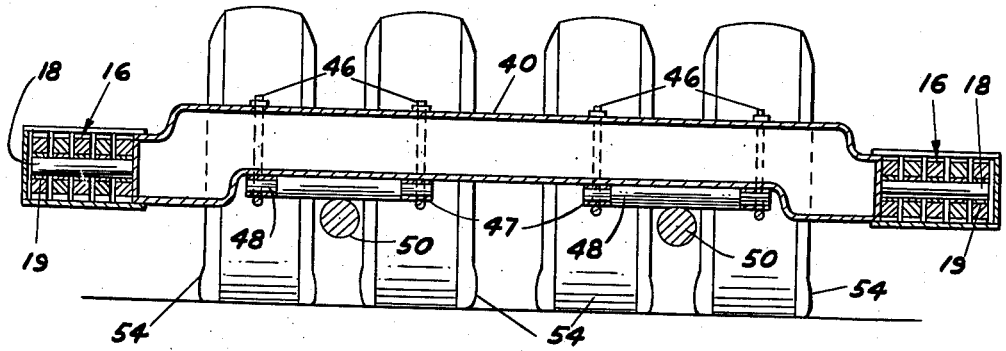
FIG. 4 is a longitudinal cross section taken substantially on the plane indicated by the line 4—4 of FIG. 2.

Another advantage of having the entire trailer unit unsprung, with the exception of that provided by the low pressure tires, is that it allows the utilization of the suspension system of the tank to act as the shock absorbing medium. As can be seen in FIG. 2, there are a total of sixteen wheels arranged in four bogie truck units 60, each of which is pivotal in a vertical plane by virtue of the walking beam mounting. Two bogie trucks are positioned side by side at the rear end, and two side by side at the intermediate articulating joints of the trailer. In order to correctly proportion the weight between the trunnion axles and the tractor attachment point 34, the unique articulating frame design is further utilized. The result attained from having the aforementioned coplanar relationship between the intermediate trunnion axles and the joints 16, depicted in FIG. 4, allows four separate load carrying sills 20 and 38, two forward and two aft of the joint 18. In this way loadings on the wheel axles do not exceed the 25,000 pound maximum allowable for a 55 ton payload.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A gooseneck type trailer comprising articulated frame sections pivotally connected together substantially midway between the ends of the trailer on a transverse axis, a plurality of axles extending transversely of said frame, wheels on said axles, and walking beams connected at both the pivotal connection and near the aft end of said trailer for movement about transverse axes, said walking beams interconnecting said axles and said frame and arranged to substantially equalize the load on said axles, said walking beams being guided by said frame for movement substantially in a vertical plane only, said frame sections being supported within the vertical limits of said wheels.

2. The trailer as defined in claim 1 wherein said wheels and axles are located inboard of the longitudinal members of said frame sections.

3. In a gooseneck type trailer for transporting vehicles comprising a horizontally disposed articulated frame structure pivotally connected into front and rear frame portions on a transverse axis at its midpoint, each of said front and rear frame portions including a pair of transversely spaced longitudinal side rails pivotally connected in longitudinal alignment respectively with the side rails of the other frame portion, a pair of transversely spaced first walking beams extending longitudinally of the frame structure and pivotally connected to said structure at said midpoint for oscillating movement about a horizontal axis extending transversely of said frame, a pair of transversely spaced second walking beams extending longitudinally of said frame structure and pivotally connected to said rear frame portion at a point located rearwardly from said first pair of walking beams, both said first and second pair of walking beams located between said side rails, at least one ground-engaging wheel carried by axles on each end of said walking beams whereby the load carried by said trailer is equally distributed to each of said axles.

4. The trailer as defined in claim 3 wherein the pivots of said first pair of walking beams and the pivotal axis of said trailer are located in a common vertical plane.

5. The trailer as defined in claim 3 wherein the center of gravity of the loaded trailer is located in a vertical plane intersecting said pivotal axis of said trailer.

6. The trailer as defined in claim 3 wherein the rearmost wheels and axles of the second pair of walking beams are castered to their associated walking beams to allow the rear wheels to track when the trailer negotiates a small radius turn.

References Cited by the Examiner

UNITED STATES PATENTS

| 1,762,915 | 6/30 | Davis | 280—81 |
| 2,009,654 | 7/35 | Fleet | 214—85.1 X |
| 2,251,584 | 8/41 | Fageol et al. | 280—419 X |
| 2,320,631 | 6/43 | McCombs | 280—81 |
| 2,446,205 | 8/48 | Wickersham et al. | 280—81 |
| 2,684,264 | 7/54 | Demos | 296—1 |
| 2,788,145 | 4/57 | Clark | 280—423 X |
| 3,099,460 | 7/63 | Sheehan | 280—104.5 |

FOREIGN PATENTS

| 569,694 | 11/57 | Italy. |

MILTON BUCHLER, *Primary Examiner.*

KENNETH H. BETTS, *Examiner.*